United States Patent [19]
Sodo et al.

[11] Patent Number: 5,433,377
[45] Date of Patent: Jul. 18, 1995

[54] INTERLOCK AND FORCED AIR FURNACE AND HRV

[75] Inventors: James P. Sodo; Steven O. Heard, both of Indianapolis; Robert W. Peitz, Jr., Fishers, all of Ind.

[73] Assignee: Carrier Corporation, Syracuse, N.Y.

[21] Appl. No.: 188,054

[22] Filed: Jan. 26, 1994

[51] Int. Cl.⁶ .................................. F24D 5/00
[52] U.S. Cl. .............................. 236/11; 165/16; 454/239
[58] Field of Search ............. 236/11; 165/16; 237/55; 454/239, 233

[56] References Cited

U.S. PATENT DOCUMENTS

| | | | |
|---|---|---|---|
| 4,044,950 | 8/1977 | Engeling et al. | 237/55 |
| 4,175,699 | 11/1979 | Engeling et al. | 237/55 |
| 4,293,094 | 10/1981 | McGillis | 237/55 |
| 4,408,716 | 10/1983 | Rockwell | 237/55 |
| 4,477,019 | 10/1984 | Breitbach | 236/10 |
| 5,046,478 | 9/1991 | Clawson | 126/110 R |
| 5,183,098 | 2/1993 | Chagnot | 165/8 |
| 5,224,650 | 7/1993 | Gozikowski | 237/55 |
| 5,257,736 | 11/1993 | Roy | 454/239 X |

Primary Examiner—William E. Wayner

[57] ABSTRACT

An electrical interlock ties a heat recover ventilator to circulation air blower operation of an associated forced-air furnace or air conditioning system. This ensure that the blower circulates supply and return air within the building or dwelling. An interlock relay has its coil energized by the heat recovery ventilator, and a normally open contact tied to the control of a blower of the forced-air system. The furnace or air conditioner and the ventilator are operated by separate controls located within the building's comfort space. When the ventilator is operated, the circulation blower runs continuously, but thermostat actuate of the furnace or air conditioner above will not operate the ventilator.

5 Claims, 2 Drawing Sheets

INTERLOCK AND FORCED AIR FURNACE AND HRV

BACKGROUND OF THE INVENTION

This invention relates generally to forced-air heating, air conditioning and ventilating apparatus in which circulation air from a comfort space is treated and is supplied back to the comfort space. The invention is also directed to forced air systems which include a heat recovery ventilator.

Heat recovery ventilators have been introduced to improve the quality of air in air-tight homes. That is, in modern homes designed to minimize or eliminate air leakage or intrusion, there is very little leakage of air into or out of the house. This can result in the accumulation of stale air. For this reason the heat recovery ventilator or HRV is installed in the home to discharge stale air and replace it with fresh make-up air from outdoors. The HRV has a heat- or heat- and- moisture exchanger incorporated into it so that in winter the leaving air warms (or warms and moistens) the entering make-up air, and in the summer the leaving air cools or cools and dries the entering warm make-up air.

The HRV typically incorporates one or more blowers to cause a positive flow of the discharge air out and the make-up air in, and can be operated on its own wall control or else tied in with a furnace or central air conditioner to go on and off with the room air circulation blower.

A number of heat recovery ventilators have been proposed, and one typical version is shown in U.S. Pat. No. 5,138,098. The HRV is typically provided with its own internal ducting separate from the return and supply ducts of the forced air furnace, air conditioner or heat pump system.

While there are clear advantages to employing the same ductwork with both the heating and cooling system and with the HRV, in practice the two systems tend to interfere with one another.

OBJECTS AND SUMMARY OF THE INVENTION

Accordingly it is an object to provide a furnace-HRV interlock that causes the circulation air blower to come on when the HRV is operating, but which will not interfere with the furnace operation.

In accordance with an aspect of this invention a furnace interlock relay is installed with its actuator coil tied to the HRV and its contacts tied to the control of the circulation air blower of the forced air furnace or fan coil. This permits the HRV to be installed in the return air ducting that extends between the comfort space and the return air plenum of the furnace or fancoil. The circulation air blower located here forces air through a heat exchanger into a supply air plenum, and supply ducting carries the treated air (i.e., heated or cooled air) back to the comfort space. Typically in the comfort space there are both a thermostatic control to actuate the furnace heat pump or air conditioner, and a separate control to actuate the heat recovery ventilator. The HRV has an inlet and an outlet coupled into the return air ducting and also has a discharge vent that discharges stale room air to the outside and a make-up air vent that takes in fresh make-up air from outside. Within the HRV are means for exchanging heat (and preferably humidity also) between the discharge air and the make-up air. Also one or more blowers or fans in the HRV propel the stale air out the discharge vent and draw the fresh outside air into the make-up air vent. In this arrangement, a call for ventilation will bring on the HRV and will also bring on the circulation air blower. However, a thermostatic call for heat, cooling, or continuous fan will not bring on the HRV without a separate call for ventilation.

The above and many other objects, features and advantages of this invention will become apparent from the ensuing description of a preferred embodiment to be read in conjunction with the accompanying Drawing.

DETAILED DESCRIPTION OF THE PREFERRED EMBODIMENT

Figure 1:
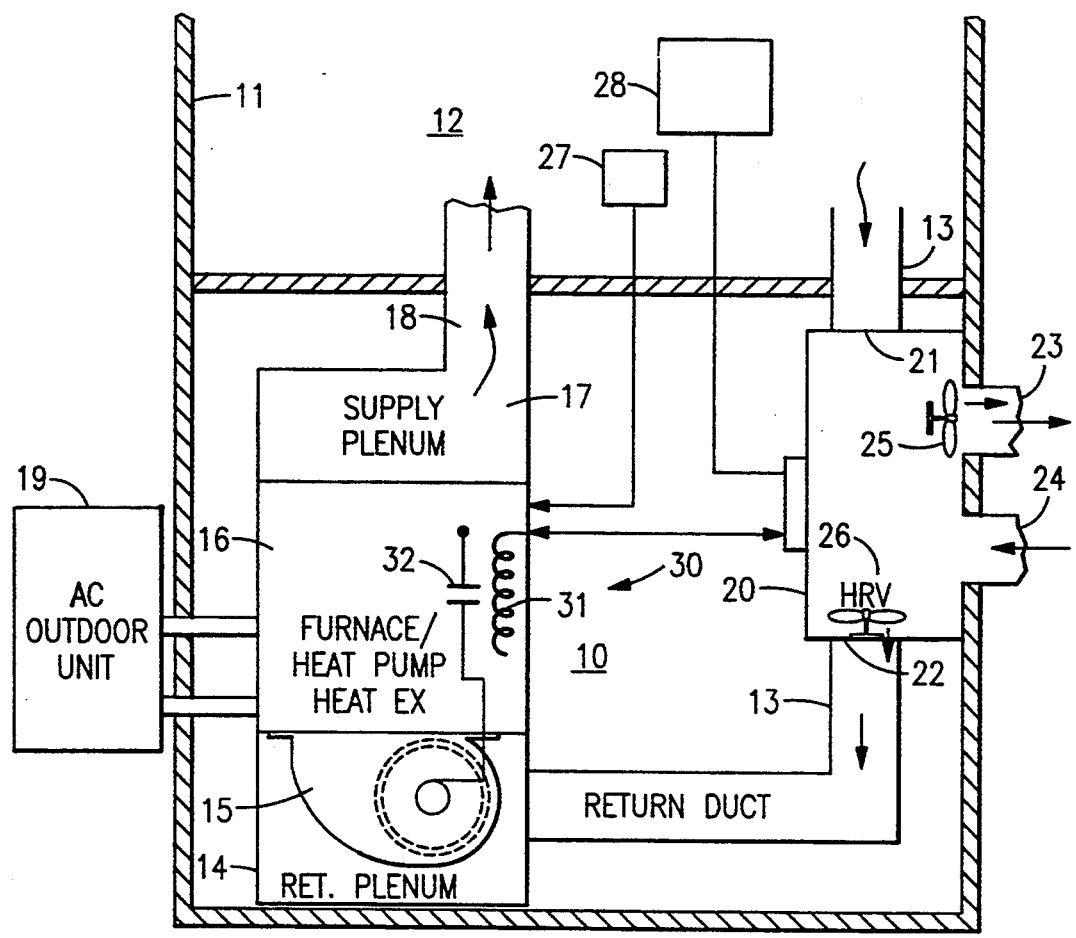
FIG. 1 is a schematic view of a forced-air heating and air conditioning system incorporating a heat recover ventilator and an interlock relay according to an embodiment of this invention.

With reference to the Drawing, FIG. 1 shows a forced air furnace 10, which can include both a gas fired heat exchanger and an indoor coil of an air conditioner or heat pump, situated within a dwelling 11 or commercial structure that includes an occupied indoor comfort space 12. A return ducting 13 brings circulation room air from the comfort space 12 to a return air plenum 14. A circulation blower 15 (or a group of blowers) forces air from the plenum 14 through a furnace heat exchanger 16 into a supply plenum 17. Here the heat exchanger 16 can also incorporate an indoor coil (not shown) of a heat pump or air conditioner. The heated (or cooled) air is then distributed from the plenum 17 through supply ducting 18 and is returned to the comfort space 12. An outdoor unit 18 for the heat pump or air conditioner can be situated outside the dwelling and connected by conduit to the heat exchanger 16.

Here, a heat recovery ventilator or HRV 20 is disposed in line in the return ducting 13 to replace some of the stale air in the comfort space 12 with fresh outdoor air. The HRV has a heat exchanger mechanism incorporated inside it, which is not shown here. One mechanism for exchanging heat and moisture between the outgoing stale air and the incoming make-up air is described in U.S. Pat. No. 5,183,098. The HRV 20 has a circulation air inlet 21 and a circulation air outlet 22 connected in line in the return air ducting 13. A discharge vent 23 exhausts the stale room air out through a wall penetration by way of a fan 25, and a fresh are inlet 24 takes in make up air from outside the dwelling 11 by way of fan 26. Not shown here in a bypass duct that ducts the return air around the HRV 20 when the later is not in use.

A thermostat device 27 is mounted on a wall in the comfort space 12 and is connected by a two-wire four-wire thermostat cable to the furnace or heat pump system 10. A separate ventilation control 28 is also mounted on a wall in the comfort space 12 and is coupled to the ventilator 20 to actuate the same when fresh air is desired or needed.

An interlock relay 30 is coupled on the one hand to the ventilator 20 and on the other hand to the furnace 10 and the circulation air blower 15 to ensure that the blower 15 is energized any time that the control 28 calls for ventilation. In the relay 30 an actuator coil 31 is electrically coupled to the HRV 20 to receive line voltage whenever the HRV 20 is actuated. A normally-open contact 32 is connected to the blower 15 to energize the blower motor. When there is a call for ventilation, the relay 30 overrides the thermostat so that the operation of the blower 15 is controlled by the ventilation control 28.

The circuit connections couple the relay 30 to the thermostat 27 and the HRV 20. The normally-open contact 32 of the relay is connected to red and green terminals R,G of a 24-volt terminal block 33. The latter is shown here connected to a furnace auxiliary junction box 34, which is further coupled to a fused disconnect unit 35.

The relay 30 also has a normally closed contact 36 which connects to a green wire G' of the thermostat 27 and to the green terminal G of the terminal block 33.

When there is no call for ventilation, the ventilator 20 is held off, and the coil 31 is unenergized. The contact 36 remains closed so the blower 15 functions normally, and comes on when there is a call for heat, a call for cooling, or a call for continuous fan.

If the ventilator 20 is on, the contact 36 opens and the contact 32 closes. This overrides the normal fan function and keeps the blower 15 on as long as the ventilator 20 is operating.

A thermostat demand for heat, cooling, or continuous fan will not bring on the operation of the HRV 20. However, a call from the HRV 20 will bring on the blower operation of the furnace or fan coil.

The normally-closed contact 36, which is interposed between the thermostat 27 and the G or fan terminal of the furnace terminal block, serves a significant isolation function. Because the fan and air conditioner control terminals G,Y are tied together in many thermostat systems, circulation blower operation during ventilator only operation could result in undesired actuation of the air conditioner outdoor unit. However, in this embodiment, when the HRV 20 is operating, the contact 36 opens and isolates the G' terminal of the thermostat.

Figure 2:
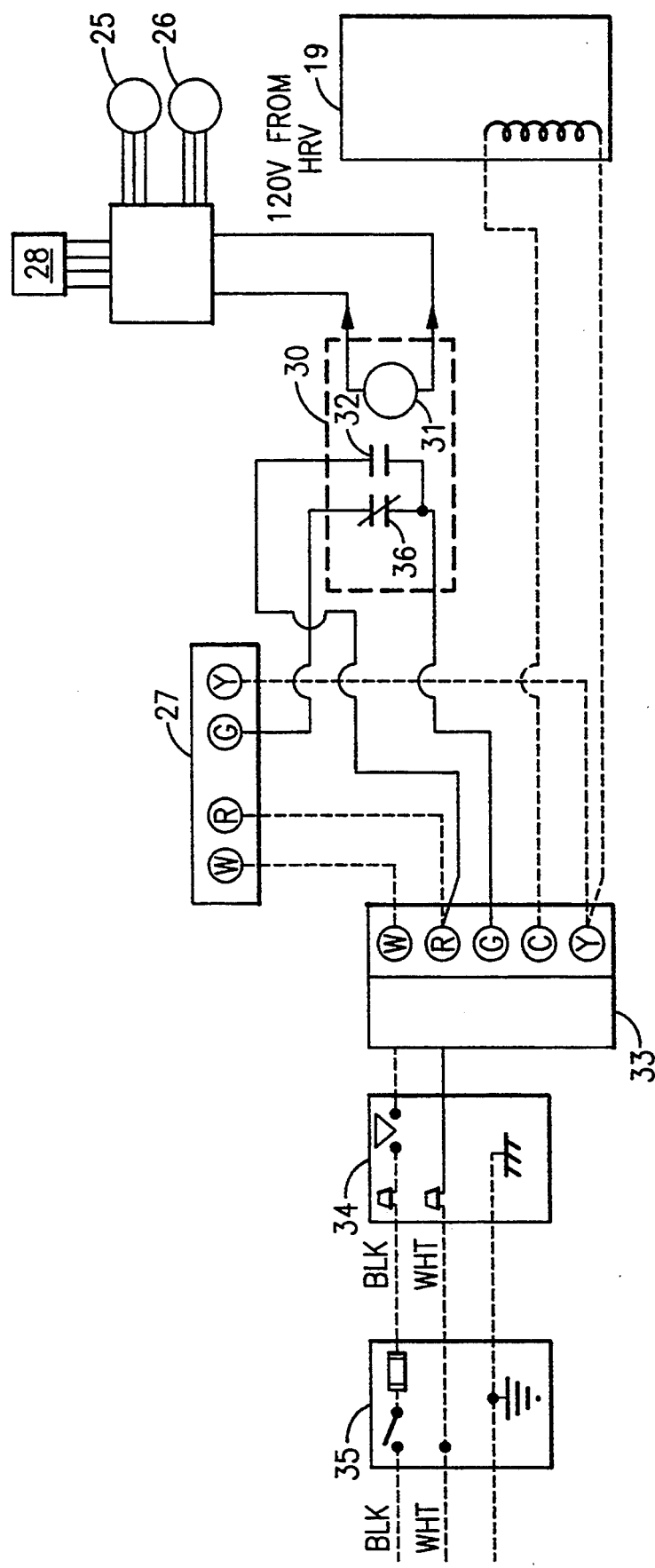
FIG. 2 is a schematic diagram showing connectivity of the interlock relay of this embodiment.

Also shown in FIG. 2 in dash line are connections for the W, R, common and Y terminals of the block 33 and for the W', R', and Y' wires of the thermostat 27. These connections can vary from one system to another, and can be configured for 2-wire or 4-wire systems.

While an electromechanical relay 30 is shown in this embodiment, it is well within the scope of this invention to employ another device, such as an optoisolator or a triac, to perform this function.

Many modifications and variations are possible without departing from the scope and spirit of this invention, as defined in the appended claims.

What is claimed is:

1. A forced air comfort system in which a circulation air blower is actuated in response to a thermostat control signal from a thermostat in an indoor comfort space and circulates indoor air from the comfort space through a supply duct to a heat exchanger which treats the indoor circulation air, and in which a supply duct returns the treated air from the heat exchanger to the comfort space; and comprising a heat recovery ventilator which discharges a portion of the circulation air to an outdoor environment and replaces the discharged circulation air with make-up air from the outdoor environment; the heat recovery ventilator including means to exchange heat between the discharged circulation air and the make-up air, blower means for inducing a flow of the make-up air from the outdoor environment and to induce a flow of the discharge air into the outdoor environment, and control means in the indoor comfort space electrically coupled to the blower means for electrically actuating same; and electrical interlock means coupling said furnace blower and the blower means of said heat recovery ventilator such that when the control means energize the blower means, the furnace blower is also energized to circulate said circulation air.

2. A forced air comfort system according to claim 1 wherein said interlock means includes a relay having an actuator coil electrically coupled to said blower means of said heat recovery ventilator, and contact means coupled to said circulation air blower.

3. A forced air comfort system according to claim 1 wherein said heat recovery ventilator has an indoor vent coupled to the return air duct and outdoor vents for discharging the discharge air outdoor and taking in the make-up air from outdoors.

4. A forced air comfort system according to claim 2 wherein said contact means includes a normally open contact coupled to said furnace blower, such that said furnace blower operates whenever said blower means of said heat recovery ventilator operates, but a call for actuation of the furnace blower without a call from said control means to actuate said heat recovery ventilator, will not operate said blower means.

5. A forced air comfort system according to claim 4, wherein said contact means further includes a normally closed contact disposed between said thermostat and a control for said furnace blower, such that actuation of said heat recovery ventilator opens said normally closed contact to isolate said thermostat from the control for said blower.

* * * * *